United States Patent
Hu et al.

(10) Patent No.: US 10,182,342 B2
(45) Date of Patent: Jan. 15, 2019

(54) DEVICE NETWORK STATUS INFORMATION

(71) Applicant: ABB Technology Oy, Helsinki (FI)

(72) Inventors: Zhongliang Hu, Espoo (FI); Mikko Kohvakka, Espoo (FI); Teemu Tanila, Espoo (FI)

(73) Assignee: ABB Technology Oy, Helsinki (FI)

( * ) Notice: Subject to any disclaimer, the term of this patent is extended or adjusted under 35 U.S.C. 154(b) by 0 days.

(21) Appl. No.: 15/726,049

(22) Filed: Oct. 5, 2017

(65) Prior Publication Data

US 2018/0098212 A1    Apr. 5, 2018

(30) Foreign Application Priority Data

Oct. 5, 2016  (EP) .................................... 16192356

(51) Int. Cl.
| | |
|---|---|
| *H04W 4/06* | (2009.01) |
| *H04W 4/70* | (2018.01) |
| *H04W 4/80* | (2018.01) |
| *H04W 8/22* | (2009.01) |
| *H04L 12/24* | (2006.01) |
| *H04L 12/26* | (2006.01) |
| *H04L 29/06* | (2006.01) |
| *H04L 29/08* | (2006.01) |

(52) U.S. Cl.
CPC ........... *H04W 8/22* (2013.01); *H04L 41/0853* (2013.01); *H04L 43/08* (2013.01); *H04L 65/4076* (2013.01); *H04L 67/125* (2013.01); *H04L 67/16* (2013.01); *H04W 4/06* (2013.01); *H04L 41/046* (2013.01); *H04L 41/082* (2013.01); *H04W 4/70* (2018.02); *H04W 4/80* (2018.02)

(58) Field of Classification Search
CPC ......... H04W 8/22; H04W 4/80; H04W 4/008; H04L 65/4076; H04L 43/08; H04L 41/0853; H04L 67/125; H04L 41/046; H04L 41/082

See application file for complete search history.

(56) References Cited

U.S. PATENT DOCUMENTS

| | | | | |
|---|---|---|---|---|
| 9,826,387 | B2 * | 11/2017 | Hu ........................ | H04W 8/005 |
| 2012/0134287 | A1 * | 5/2012 | Turunen .................. | H04W 4/06 370/252 |
| 2013/0279488 | A1 * | 10/2013 | Singh .................... | H04W 48/16 370/338 |
| 2014/0269555 | A1 | 9/2014 | Sadasivam et al. | |
| 2016/0204611 | A1 * | 7/2016 | Chambon ............. | H02J 3/1835 307/26 |
| 2016/0360416 | A1 * | 12/2016 | Schroderus ........... | H04W 12/08 |

OTHER PUBLICATIONS

European Search Report, EP 16192356, ABB Technology Oy; dated Mar. 29, 2017, 6 pages.

\* cited by examiner

*Primary Examiner* — Brandon J Miller

(74) *Attorney, Agent, or Firm* — J. Bruce Schelkopf; Taft Stettinius & Hollister LLP

(57) ABSTRACT

To provide status information on devices in a device network, the devices are configured to broadcast status information, both own and received, and store in addition to own status information also received status information of other devices.

18 Claims, 4 Drawing Sheets

DEVICE NETWORK STATUS INFORMATION

RELATED APPLICATIONS

This application claims priority to European patent application no. 16192356.0, filed on Oct. 5, 2016, the contents of which is hereby incorporated herein by reference in its entirety.

FIELD

The present invention relates to status information in a device network.

BACKGROUND ART

The evolvement of communication technology, particularly wireless communication technology and end user devices, has enabled versatile communication possibilities and introduction of different services. An example of such a service is a remote support for maintenance staff of machines and equipment. There are smartphone applications that allow a user of the smartphone to receive status information of a machine from the machine over a Bluetooth connection, for example.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide a method, a device, a system and a computer program product for providing possibility to obtain status information on plurality of devices by connecting to one device.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

The present invention is applicable to any device that is configurable to receive, transmit and store status information, and a system comprising such devices.

Figure 1:
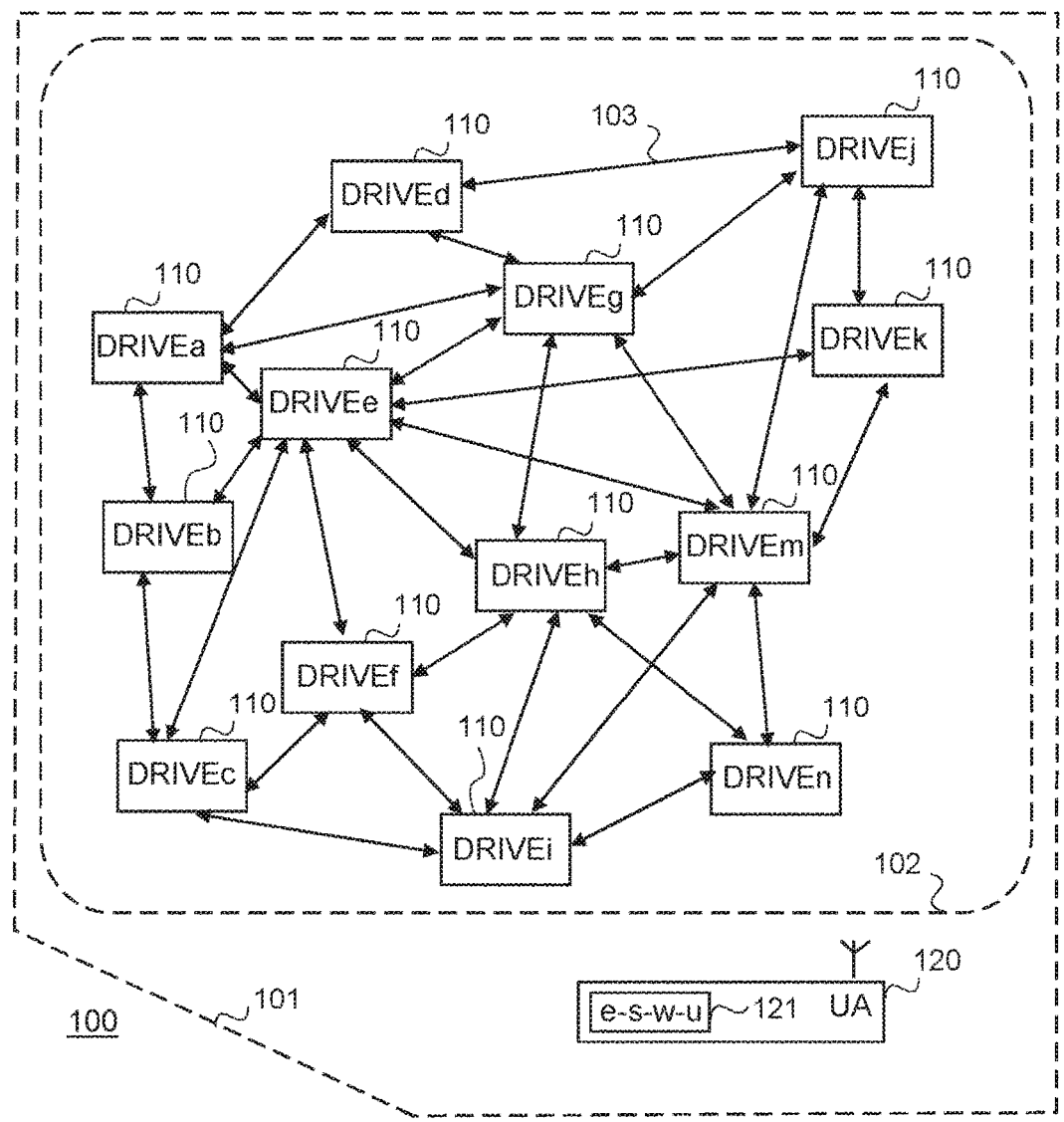
FIG. 1 shows simplified architecture of a system.

An extremely general architecture of an exemplary system 100 is illustrated in FIG. 1. FIG. 1 is a simplified system architecture only showing some elements, functional entities, which are logical units whose implementation may differ from what is shown, and some equipment. It is apparent to a person skilled in the art that the system comprises any number of shown elements, other equipment, and structures that are not illustrated.

In the embodiment illustrated in FIG. 1, the system 100 comprises one or more sites 101 (only one illustrated in FIG. 1) comprising one or more device networks 102 formed by devices 110 at a site and one or more user apparatuses 120 (only one illustrated in FIG. 1) that may enter the site 101. Naturally the system may comprise one or more service centers, remote and/or local, and one or more networks over which one or more devices 110 at the site and/or the one or more user apparatuses 120 may connect to the one or more service centers. However, the service center(s) and the network(s) over which to connect to the service center(s) are not described in more detail herein since the focus is in functionality at the site.

The user apparatus 120 refers to a computing device (equipment), that may be a non-portable device or a portable device, and it may also be referred to as a user terminal or user device. Portable computing devices (apparatuses) include wireless mobile communication devices operating with or without a subscriber identification module (SIM) in hardware or in software, including, but not limited to, the following types of devices: mobile phone, smart-phone, personal digital assistant (PDA), laptop and/or touch screen computer, tablet (tablet computer), multimedia device, and wearable devices. The user apparatus 120 is configured to establish connections to the devices at the site, and to acquire/retrieve different information, such as status information on a device via a corresponding interface. To display status information on multiple devices, for example as illustrated below with FIGS. 8 and 9, the user apparatus 120 may comprise a remote maintenance application, for example, as a mobile app, that comprises as part of the application, or as an add-in or a plug-in to the application, an enhanced status view display unit (e-s-w-u) 121, for remote maintenance purpose. The configuration of the user apparatus may be according to prior art, or any future corresponding configuration may be used.

The site 101 is a cluster or a farm or a fleet of devices 110, and the devices may be of same type, as illustrated in FIG. 1, or the cluster/farm/fleet of devices may comprise different types of devices. The site 101 may be an industrial site, a residential site, or a commercial site, and any combination thereof. The devices 110, or some of the devices 110, at the site 101 may locate near each other, and/or the distance between the devices 110, or between some of the devices 110, may be rather long. For example, devices may locate rather near to each other in a factory but in an offshore wind farm at least some of the devices may locate rather far away from each other.

The devices 110 at the site 101 form a device network 102, i.e. a local network, in which a device is connectable at least to one other device over a local connection. The device network 102 may be a mesh network. Examples of such local connections are depicted in FIG. 1 by double-headed arrows, one of which is indicated also by a reference number 103. The local connection may be a direct connection, for example a Bluetooth connection, or a connection over a local wireless network, like Wi-Fi or Li-Fi, or a wired connection using Ethernet, for example. Naturally the connection may be provided by any mobile system, such as GSM, GPRS, LTE, 4G, 5G and beyond. In other words, the local connection may be based on any existing or future communication technology, any connection type over which data may be transmitted, may be used, and the local connections in the device network may be of different type. For example, in the factory all local connections may use Bluetooth, whereas in the offshore wind farm, some connections may use Bluetooth and some may be wired connections.

In the example illustrated in FIG. 1, the plurality of devices 110 whose status information may be acquired/requested are depicted as drives. It should be appreciated that the drives in FIG. 1 depict any device, machine, equipment, system and a process whose status information, such as one or more parameters or their values, may be acquired/requested via an interface. Other examples of such equipment include frequency converters, AC/DC modules, DC/AC modules, programmable logic controllers, switches, motion controllers or motion drives, servo motors, soft starters, robots, wind turbines, solar panels, solar inverters, and heavy equipment, etc. It should be appreciated that in the above only some examples are listed.

Although in FIG. 1 a plurality of devices 110 is illustrated, it should be appreciated that a device network 102 may be created by two devices 110.

Figure 2:
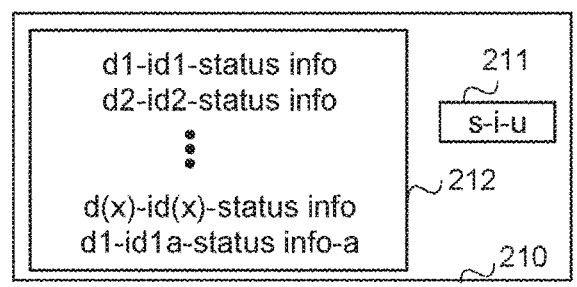
FIG. 2 shows a simplified block diagram of a device.

FIG. 2 is a block diagram illustrating some entities in an exemplified device that is configurable to manage status information.

Referring to FIG. 2, the device 210 is configured to provide status information on the entire device network whereto the device 210 belongs when status information of the device is requested/inquired. For that purpose the device 210 comprises a status information unit (s-i-u) 211 configured to maintain status information in a memory 212 and to cause sending of different status information related messages, or corresponding pieces of information, as will be described in more detail below with FIGS. 3 to 9.

In the example illustrated in FIG. 2, the memory 212 comprises the entire device network status information as a single log file (log). In other words, in the illustrated example the log comprises status information on all devices in the device network. Naturally the log may be divided into different parts. For example, there may be a part for status information of the device, and another part for status information of other devices in the device network, and/or there may be a part for latest status information and a part for history status information. In other words, any internal structure for the status information may be used.

Depending on the implementation and/or settings, the log may comprise only the latest status information, only certain amount of latest status information per device, such as three latest, four latest, etc., and/or there may be an age limit to the status information in the log file, and/or the log may comprise history information. Naturally more status information of the device 210 may be maintained than what is maintained on other devices in the device network. For example, as depicted in FIG. 2, for a device D1 there are two different status information (status info and status info-a), whereas for the other devices only one status information is maintained.

The status information may comprise any kind of information on use, events, operation environment, lifetime status, etc. Examples of status information include events, faults, warnings, other results of operation monitoring, such as usage time (current, average, max, etc.), estimated time to a next maintenance, which component should be changed, estimation which component will fail next, a value exceeding a limit, a value being below a minimum limit, and inhibits, for example reason(s) why a device cannot start, different parameters and/or their values, such as temperature (current, average, min, max, cycles), average temperature, environmental temperature, humidity, vibration, etc., just to list some examples in a non-exhaustive manner. Further, it should be appreciated that the status information of a device may comprise only one piece of information, or any amount of pieces of information. The choice what constitutes the status information may depend on devices in the device network, it may be different for different devices in the device network, and there are no restrictions; one or more pieces of information obtainable from a device may be set to be part of the status information.

Below different exemplified functionalities of the device 210, or more precisely the status information unit 211, are described using a frame as an example of a digital data transmission unit, without limiting the examples to a use of a frame. It is a straightforward process to implement the examples to any other kind of a transmission unit. Further, below term "status" is used for a piece of status information determined for a device at a certain moment, according to settings of the device. It should be appreciated that any settings may be used, including what constitutes the status, and how often it is determined and/or what triggers the determination of the status.

Figure 3:
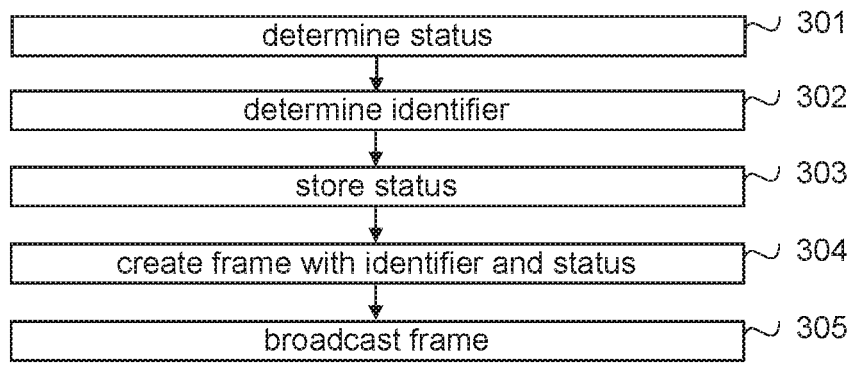
FIGS. 3 to 7 are flow charts illustrating exemplary functionalities.

FIG. 3 illustrates an exemplary functionality of a device at a site, or more precisely an exemplary functionality of the status information unit, relating to status information of the device. The exemplified functionality illustrated in FIG. 3 starts when a status of the device is to be determined.

Referring to FIG. 3, when the status of the device is determined in step 301, the status information unit determines in step 302 an identifier for the determined status, called below status identifier. The status identifier comprises at least a variable part that may be a time stamp indicating the time the status is determined in step 301, or a running number, for example. The status identifier may comprise as a fixed part an identifier of the device, which identifies the device uniquely at least in the device network. The purpose of the status identifier is to separate different statuses, as will become evident with FIG. 5. However, there may be implementations without a status identifier, or at least its variable part, for example in implementations using message with a certain life time, set by the message originator.

Then the status is stored in step 303 to the memory, to be part of the corresponding status information. Depending on the implementation, the status information is stored with the status identifier (i.e. associated with the status identifier), or with the variable part of the status identifier or without the status identifier, either to the log or to a device-specific part of the log in the memory, and it may replace an older status information or just be added to form history status information.

Further, a frame is created in step 304, and the status identifier and the status are added to the frame, and broadcast of the frame is caused in step 305 to all devices within its range, i.e. to devices with which the device has a connection or in a non-connected mode to all devices that are near enough to receive the broadcast. If the identifier does not contain the fixed part, i.e. the identifier of the originating device, the identifier of the device is added to the frame, either to a header or to a body, or the originating device is indicated according to the used broadcast communication technology.

Broadcasting may be performed by sending advertisements, or any corresponding frames that can be sent and received in a non-connected mode. Broadcasting may also be performed by forwarding the frame over each connection the device has, for example using flooding type of multi-hop broadcast or bridging, or a combination of broadcast and convergecasting. In other words, any kind of broadcast may be used.

Figure 4:
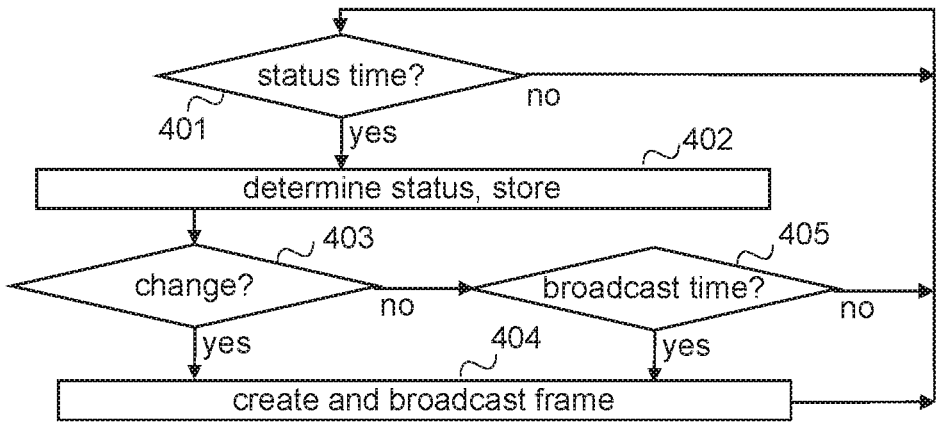

FIG. 4 illustrates another an exemplary functionality of a device at a site, or more precisely an exemplary functionality of the status information unit, relating to status information of the device. In the example it is assumed that the device, or more precisely the status information unit, is configured to broadcast its status when the status changes, or at certain intervals, called broadcast intervals. Further, in the example it is assumed that the status is determined at certain intervals, called status intervals. The status intervals are shorter than the broadcast intervals, and the broadcast interval may be a multiple of the status interval, but that need not to be the case. The device may be configured, for example, have a separate unit, or the status information unit may be configured to analyse and determine status, detect a fault or a warning, etc. This may be achieved by monitoring and/or by using one or more criteria/rules. For example, if a value is above or below a threshold, activation of a safety function, such as safe-torque-off, is activated.

Referring to FIG. 4, it is monitored in step 401, whether or not it is time to determine the status of the device. When it is, the status is determined in step 402 and stored to the memory, as described above.

If there was a change in the status (step 403: yes), for example a value of a parameter has changed, or a fault is detected, or a warning is to be given, a fault is corrected, etc., a frame containing the status information is created in step 404, the creating including, if not performed in step 402, generating/determining an identifier, as described above, and broadcast of the frame is caused in step 404, as described above. The broadcast preferably causes resetting a counter monitoring the broadcast interval, in which case the broadcast interval ensures a fixed interval between two status broadcast without any change. However, the counter monitoring the broadcast interval may be independent of the broadcast caused by a change, in which case the counter is not resat when a change causes broadcast of the status. Then the process proceeds to step 401 to wait for the next time to determine the status of the device.

If there is not a change in the status (step 403: no), it is checked in step 404, whether or not it is time to broadcast the status. In other words, it is checked, whether or not the time lapsed from the last broadcast exceeds the broadcast time interval, or is the same as the broadcast time interval. If the time lapsed from the last broadcast is smaller than the broadcast time interval, it is not time to broadcast the status (step 405: no), and the process proceeds to step 401 to wait for the next time to determine the status of the device. If it is time to broadcast the status (step 405: yes), the process proceeds to step 404 to create and cause broadcast of a frame containing the status information. As said above, the time from the last broadcast may be monitored from the actual last broadcast, or from previous broadcast caused by the time exceeding the broadcast interval.

By having the two different triggers to broadcast the status it is ensured that a change, such as a fault detected, or fault corrected is broadcast, thereby minimizing the load to the device network, when the same status is not broadcast, but by broadcasting the same status at longer intervals, it is easy to ensure that the device's broadcast functionality is in proper order, and if the status has a lifetime in memories of devices in the device network, there will always be the status of a properly functioning device.

Figure 5:
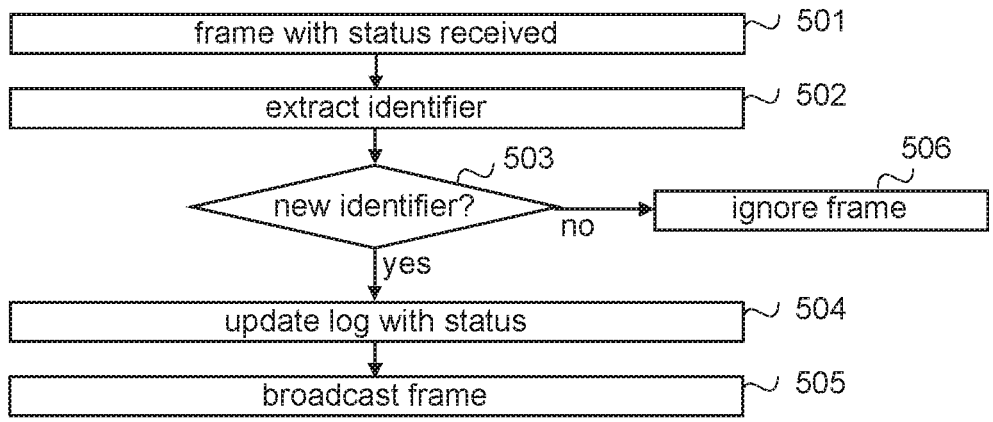

FIG. 5 illustrates an exemplary functionality of a device at a site, or more precisely an exemplary functionality of the status information unit, relating to status information of other devices.

Referring to FIG. 5, when a frame containing status information is received in step 501, an identifier (a status identifier) in the frame is extracted, or otherwise determined in step 502. In other words, at least the frame originator, i.e. the device whose status is in the frame, and the variable part are determined. The status identifier is then compared in step 503 to status identifiers in the log to find out, whether or not the status identifier, and thereby also the status in the frame, is a new one. The comparison may comprise sub-steps including determining whether the device who receives the frame is also the originator, and if it is, determining, without comparing the variable part, or the status identifiers, that the status identifier is not a new one.

If the identifier is a new one (step 503: yes), the log is updated in step 504 to contain the status information in the frame. In other words, the status information is stored with the status identifier (i.e. associated with the status identifier), to the log, and depending on an implementation the status may replace an older status information of the same originating device or just be added to form history status information.

Further, broadcast of the frame is caused in step S05. In other words, the frame is replicated, if necessary, and forwarded over each local connection, and/or advertised, as described above with FIG. 3. It should be appreciated that depending on an implementation, the frame may be send or not send back in step 505 to the device wherefrom it was received in step 501.

If the identifier is not a new one (step 503: no), it has been received earlier, or it is a frame originating from the device and containing its status information, and therefore the frame is ignored in step 506. In other words, it is not forwarded any more. Thanks to this, unnecessary re-circulation of the frames is avoided while by step 505 it is ensured that all frames reach all devices in the device network.

Figure 6:
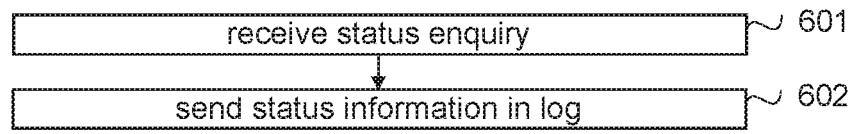

FIG. 6 illustrates an exemplary functionality of a device at a site, or more precisely an exemplary functionality of the status information unit, relating to status information enquiries.

Referring to FIG. 6, when a status enquiry is received in step 601, sending of the status information in the log is caused in step 602. A default setting may be that always all the information in the log is sent. However, it should be appreciated that also only part of the information in the log, such as only the newest information per device, may be sent. Hence, an enquiry to one device results to receiving status information on all devices in the device network.

Figure 7:
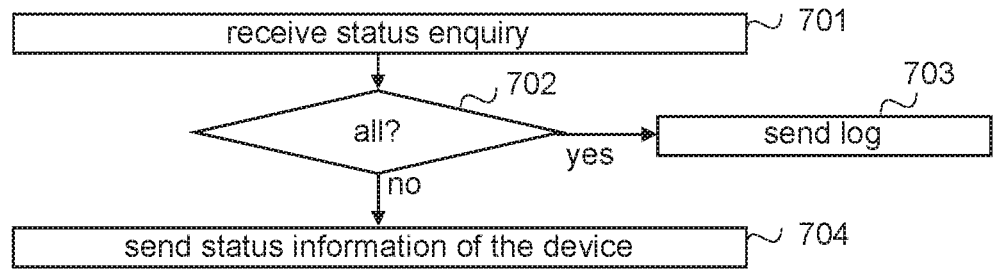

FIG. 7 illustrates another exemplary functionality of a device at a site, or more precisely an exemplary functionality of the status information unit, relating to status information enquiries. In the illustrated example there exists two different kind of status enquiries, one for requesting status information on all the devices in the device network, and one for requesting status information on the device who receives the enquiry.

Referring to FIG. 7, when a status enquiry is received in step 701, the type of the enquiry is checked in step 702. If the enquiry is for all devices (step 702: yes), sending of the status information in the log is caused in step 703. In other words, status information on all the devices in the device network is sent.

If the enquiry is not for all devices (step 702: no), sending status information of the device is caused in step 704. For example, if the log contains a certain amount of statuses, and there is a separate history log for the device, in step 704 sending also the history log is caused, whereas in step 703 the history log may not be in the sent status information.

Figure 8:
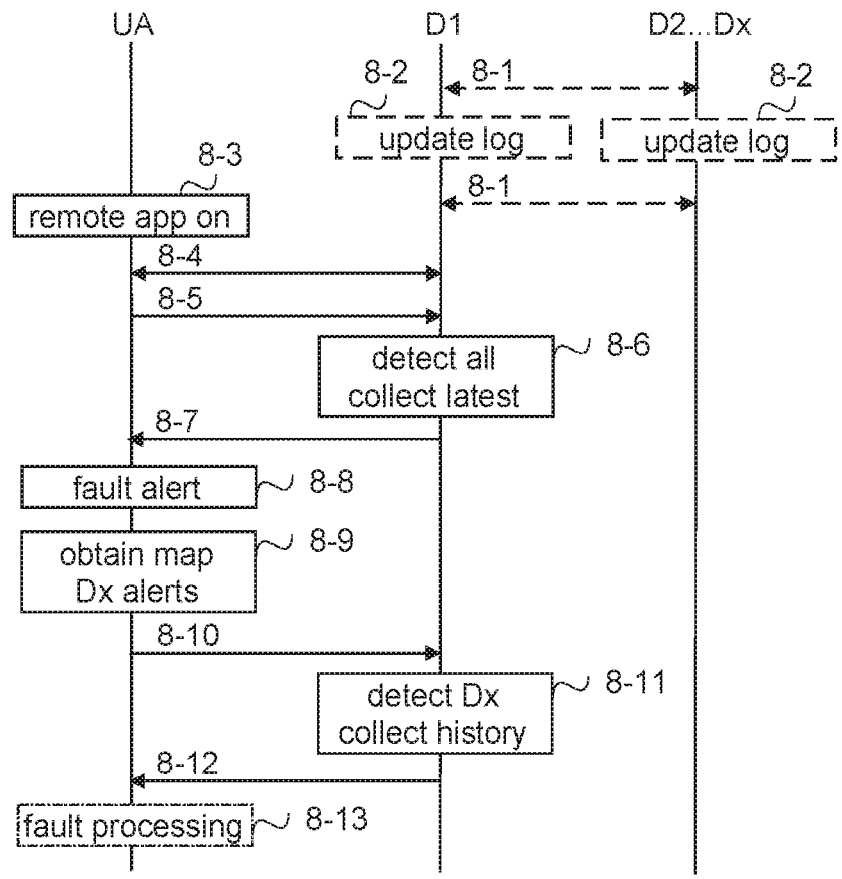
FIGS. 8 and 9 illustrate exemplary information exchanges.

FIG. 8 illustrates information exchange in an exemplary situation. In the example it is assumed that only the latest status information on the log is sent unless status information on a specific device is requested. Then all status information that is stored to the log is sent. It should be appreciated that implementing the same principles to any other amount of status information, or remote application functionality, or enhanced status view display unit functionality, is a straightforward process. Below it is assumed that the remote application unit includes the enhanced status view display unit and no difference which unit performs which part is made, since the division bears no significance, the result being the same.

Referring to FIG. 8, devices D1 to Dx, or more precisely, corresponding status information units, at a site broadcast in messages 8-1 status information, either own or others, and update their logs (point 8-2) correspondingly, as described above with FIGS. 2 to 5.

Then a user apparatus UA enters the site, and the user turns on a remote application. In the illustrated example, the remote application causes the user apparatus to establish a connection (messages 8-4) to the nearest device, which in the example is the device D1. In the illustrated example, once the connection has been established, the remote application causes the user apparatus to request (message 8-5) status information from the device D1.

Upon receiving the request, the device D1, or more precisely the status information unit, detects in point 8-6 that the request does not indicate any specific device, and therefore the latest status on each device D1 to Dx is collected in point 8-6 from the log, and sending collected statuses as a response in message 8-7 to the user apparatus is caused.

In the illustrated example, the status information, i.e. the collected statuses, contains something that causes the remote application to output in point 8-8 a fault alert on the user interface of the user apparatus. In another example, the received status information is output regardless on the status information content (alert or not). The user of the user apparatus wants to know which one(s) of the devices cause(s) the fault alert and inputs a request for a map (that is not illustrated in FIG. 8). That causes the remote application to obtain/download in point 8-9 a map of the site, either from its internal memory, or from a service desk, for example. Once the map is there, the remote application determines for each status a geographical location of the device to show devices in their location with corresponding status information. In the illustrated example, the status information of the device Dx shows a fault, i.e. the device Dx alerts (point 8-9).

The user of the user apparatus wants to obtain history status information, and inputs a corresponding request (that is not illustrated in FIG. 8), causing a request for history status information of Dx to be sent (message 8-10) to the device D1.

Upon receiving message 8-10, the device D1, or more precisely the status information unit, detects in point 8-11 that the request indicates Dx, and therefore the history status information on Dx is collected in point 8-11 from the log, and sending the history status information on DX as a response in message 8-12 to the user apparatus is caused.

Then a normal fault processing (point 8-13) may continue.

In an alternative embodiment, no user input is required, but the remote application is configured to, after processing the received status information, or if the status information itself indicates the actual status, to obtain a map, show alerting devices, if any, and obtain history status information, on alerting devices.

Naturally, the remote application may be configured always to output the status information on the map, i.e. the status information outputted in point 8-8 may indicate that all devices, or at least some of them, in the device network operate properly, and the map is used to illustrate devices belonging to the device network.

Figure 9:
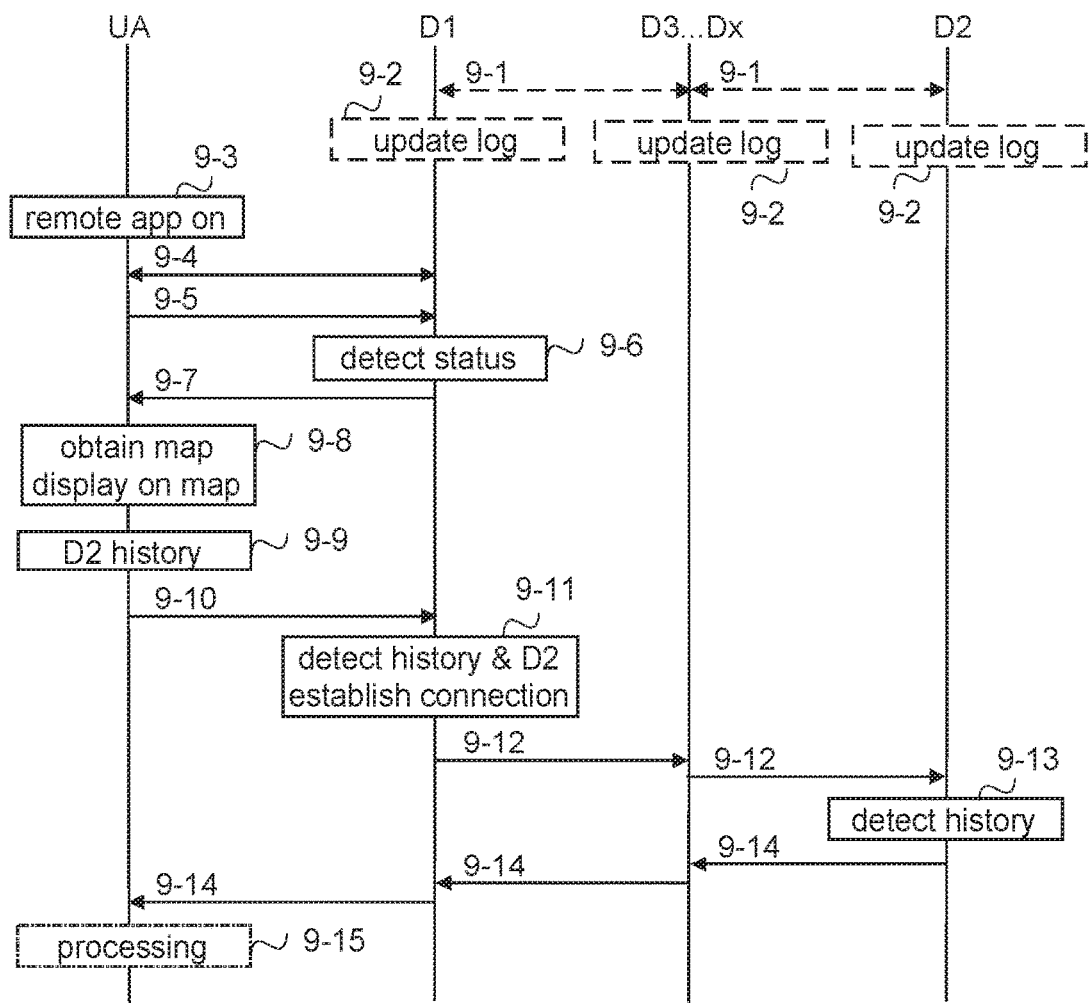

FIG. 9 illustrates information exchange in another exemplary situation. In the below example it is assumed, for the sake of clarity, that each device is configured to maintain two kinds of status information logs; a status log comprising the latest status information received from other devices and the latest status information of the device itself, and a history log whereto older status information and/or more detailed status information of the device is stored. However, applying the teachings to other kind of solutions for status information is a straightforward process for one skilled in the art. Further, in the example it is assumed that the received status information is always outputted to the map, without any specific user request. It should be appreciated that the other alternatives described above and below may be used as well.

Referring to FIG. 9, devices D1 to Dx, or more precisely, corresponding status information units, at a site broadcast in messages 9-1 status information, either own or others, and update their logs (point 9-2) correspondingly, as described above.

Then a user apparatus UA enters the site, and the user turns on a remote application. In the illustrated example, the remote application causes the user apparatus to establish a connection (messages 9-4) to the nearest device, which in the example is the device D1. In the illustrated example, once the connection has been established, the remote application causes the user apparatus to request (message 9-5) status information from the device D1.

Upon receiving the request, the device D1, or more precisely the status information unit, detects in point 9-6 that the request is for status information, and therefore sending the information in the status log, i.e. the latest status on each device D1 to Dx, in message 9-7 to the user apparatus is caused. (Message 9-7 is a response to the request in message 9-6). It should be appreciated that in case there is a device that is not alive, i.e. its status information has not been updated in a timely manner, the status information of the device may indicate "no status", or be empty.

In the illustrated example, reception of the status information, causes in point 9-8 the remote application to obtain/download a map of the site, either from its internal memory, or from a service desk, for example. Naturally the map may be obtained earlier, for example when the remote application is turned on or when the user equipment having the remote application on, enters the site. Once the map is there, the remote application determines for each status a geographical location of the device to show devices in their location with corresponding status information. As a result, in point 9-8, the received information is output on the map. An advantage of this approach is that this provides information even when a device is failing to communicate—a device without any status information (or possibly with very old information, if time is shown with the information and status log is implemented to store the last received information regardless of its age) clearly indicates that there is something wrong with the device.

In the illustrated example, the user of the user apparatus wants to obtain history status information on D2, and inputs a corresponding request (that is not illustrated in FIG. 9), causing in point 9-9 a request for history status information of D2 to be sent (message 9-10) to the device D1.

Upon receiving message 9-10, the device D1, or more precisely the status information unit, detects in point 9-11 that the request is for history status information (or detailed log information) and indicates D2, and therefore forwarding the request in message 9-12 to the device D2 is caused. This may require that devices forwarding the request, and in return the response, establish connections to operate in connected mode to be able to send the request and the response hop-by-hop, for example. However, that is not illustrated in FIG. 9.

Upon receiving message 9-12, the device D2 detects in point 9-13 that it is a request for its history status information. That causes sending the content of the history log in the device D2 in message(s) 9-14 to the user apparatus as a response to the request.

Then any processing (point 9-15) of the information, like normal fault processing, may continue.

In the above example it was assumed that connection establishment to the device D2 succeeds. Naturally, if the connection establishment fails, instead of receiving the history status information, the device D1 could send instead of the status information an indication that the device D2 cannot be connected to. For example, if the status information of the device D2 received in message 9-7 would have been empty (or "no status") or very old, the response "no connection" would confirm that the device D2 is down.

Naturally the above example may be modified so that no user input is required, but the remote application is configured to obtain history status information, when certain conditions, like a device is alerting or a device is without status information, is detected.

As can be seen, since the device itself does not process the status information, it may collect status information on any device.

Further, as can be seen especially from the example illustrated in FIGS. 8 and 9, the user apparatus entering a site may receive status information on devices which are not within the range of the user apparatus. This is a very useful feature, especially in locations that are difficult, or even dangerous, to reach. Further, this speeds up to detecting fault situations since the user of the user apparatus does not need to wander around the site to find out which device(s) cause(s) problem(s), and hence the overall malfunction time is decreased, thereby increasing productivity.

As is evident from the above, a decentralized device network log is established and maintained without any centralized database system, or Internet connection, or a cloud environment (cloud computing), or all of the devices being connected to each other. Nevertheless, a user, or more precisely, a user apparatus can receive status information on the entire device network simply by contacting a device in the device network.

The steps, points, related functions, and information exchanges described above by means of FIGS. 3 to 9 are in no absolute chronological order, and some of them may be performed simultaneously or in an order differing from the given one. Other functions can also be executed between them or within them, and other information may be sent. For example, the status information may be associated with the time it was determined and/or received. Some of the steps or points or part of the steps or points or one or more pieces of information can also be left out or replaced by a corresponding step, point or part of the step, point or one or more pieces of information. For example, when no status identifier is used, steps 302, 502, 503, and 506 are skipped over. Another example includes that instead of a map a list of devices is provided, each associated with a corresponding status information (if received). The list may be obtained/acquired beforehand, preferably containing all devices installed in the site, or the list may be created based on the received information.

The techniques and methods described herein may be implemented by various means so that an apparatus/device configured to support device network wide status information management concept based on at least partly on what is disclosed above with any of FIGS. 1 to 9, including implementing one or more functions/operations of a corresponding device described above with an embodiment/example, for example by means of any of FIGS. 3 to 9, comprises not only prior art means, but also means for implementing the one or more functions/operations of a corresponding functionality described with an embodiment, for example by means of any of FIGS. 3 to 9, and it may comprise separate means for each separate function/operation, or means may be configured to perform two or more functions/operations. For example, one or more of the means and/or the status information unit described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIGS. 1 to 9, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 10:
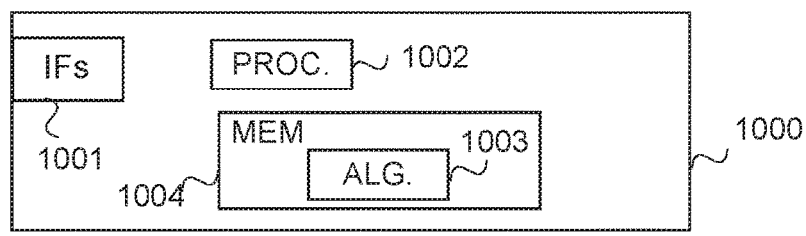
FIG. 10 is a block diagram of an exemplary device.

FIG. 10 provides an apparatus (device) according to some embodiments of the invention. FIG. 10 illustrates an apparatus configured to carry out the functions described above in connection with the device. Each apparatus may comprise one or more communication control circuitry, such as at least one processor 1002, and at least one memory 1004, including one or more algorithms 1003, such as a computer program code (software) wherein the at least one memory and the computer program code (software) are configured, with the at least one processor, to cause the apparatus to carry out any one of the exemplified functionalities of the device.

The memory 1004 may be implemented using any suitable data storage technology, such as semiconductor based memory devices, flash memory, magnetic memory devices and systems, optical memory devices and systems, fixed memory and removable memory. The memory may comprise a configuration database for storing transmission time interval configuration data, as described above, for example with FIG. 1.

The apparatus may further comprise different interfaces 1001, such as one or more communication interfaces (TX/RX) comprising hardware and/or software for realizing communication connectivity according to one or more communication protocols. The communication interface may provide the apparatus with communication capabilities to communicate in any communication system and enable communication between different devices in the device network and between the device and the user apparatus, for example. The communication interface may comprise standard well-known components such as an amplifier, filter, frequency-converter, (de)modulator, and encoder/decoder circuitries and one or more antennas. The communication interfaces may comprise radio interface components providing the device with radio communication capability. The communication interface may be provided by means of a module (a terminal device) providing at least a wireless interface to which the user apparatus may connect to. The module may be a separate terminal device, or a module detachable connectable to the device, or equipment integrated to the device. At the simplest the module may be the mere wireless interface. Other examples of the module include a control panel, smartphone, mobile phone, tablet or laptop computer. At least in the solutions in which the module is not integrated with the device, the module may be located onsite at a close proximity of the device to which a connection may be provided via a communication interface by Bluetooth, NFC, WiFi, Li-Fi, and/or inductive connection (such as an inductive connection according to an inductive power standard (Qi) by the Wireless Power Consortium), for example. Further, the apparatus 1000 may or may not comprise one or more user interfaces, such as a screen, microphone and one or more loudspeakers for interaction with the user.

Referring to FIG. 10, at least one of the communication control circuitries in the apparatus 1000 is configured to provide the status information unit, or any corresponding sub-unit, and to carry out functionalities described above by means of any of FIGS. 3 to 9 by one or more circuitries.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a wireless network device.

In an embodiment, the at least one processor, the memory, and the computer program code form processing means or comprises one or more computer program code portions for carrying out one or more operations according to any one of the embodiments of FIGS. 3 to 9 or operations thereof.

Embodiments as described may also be carried out in the form of a computer process defined by a computer program or portions thereof. Embodiments of the methods described in connection with FIGS. 3 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A method comprising:
   determining, by a first device, a piece of status information of the first device;
   storing, by the first device, the determined piece of status information to a status information log in the first device;
   causing, by the first device, broadcast of the determined piece of the status information of the first device to one or more second devices belonging to the same device network;
   receiving in the first device as broadcast one or more pieces of status information of the one or more second devices;
   storing, by the first device, the received one or more pieces of status information of the one or more second devices to the status information log in the first device; and
   causing, by the first device, broadcast of the received one or more pieces of status information.

2. The method of claim 1, further comprising:
   generating by the first device identifying information for the piece of status information of the first device;
   causing, by the first device, broadcast of the piece of the status information of the first device with the identifying information;

determining by the first device from each received broadcast identifying information with which the received piece of status information of a second device is broadcasted;

comparing by the first device the identifying information with identifying information stored to the status information log;

if the status information log comprises the same identifying information, ignoring the received piece of status information; and if the status information log does not comprise the same identifying information, storing the received piece of status information of the second device with the identifying information to the status information log and causing broadcast of the received piece of status information.

3. The method of claim 1, further comprising:
receiving in the first device a status information request;
causing sending from the first device in a response to the status information request the status information log.

4. The method of claim 3, further comprising causing sending in the response the latest pieces of status information of the first device and of the one or more second devices.

5. The method of claim 3, further comprising:
determining, by the first device, whether the status information request is addressed to a specific device;
if not, causing sending in the response the status information log;
if a specific device is addressed, causing sending a response comprising one or more pieces of status information of the specific device in the status information log in the first device.

6. A computer program product comprising a non-transitory computer-readable storage medium having stored thereon computer program instructions which, when run by at least one processor, cause the at least one processor to:
determine a piece of status information of a first device comprising the processor;
store the determined piece of status information to a status information log in the first device;
cause broadcast of the determined piece of the status information of the first device to one or more second devices belonging to the same device network;
store, in response to the first device receiving as broadcast one or more pieces of status information of the one or more second device, received one or more pieces of status information of the one or more second devices to the status information log in the first device; and
cause broadcast of the received one or more pieces of status information.

7. A device comprising at least one processor, and at least one memory including computer program code, wherein the at least one memory and the computer program code are configured to, with the at least one processor, cause the device at least to:
determine a piece of status information of the device;
store the determined piece of status information to a status information log in the device;
cause broadcast of the determined piece of the status information of the device to one or more second devices belonging to the same device network;
store, in response to the device receiving as broadcast one or more pieces of status information of the one or more second devices, received one or more pieces of status information of the one or more second devices to the status information log in the device; and
cause broadcast of the received one or more pieces of status information.

8. The device of claim 7, wherein the at least one memory and the computer program code are configured to, with the at least one processor, further cause the device at least to:
generate identifying information for the piece of status information of the device;
cause broadcast of the piece of the status information of the device with the identifying information;
determine from each received broadcast identifying information with which the received piece of status information of a second device is broadcasted;
compare the identifying information with identifying information stored to the status information log;
ignore the received piece of status information if a comparison result is that the status information log comprises the same identifying information; and
if the comparison result is that the status information log does not comprise the same identifying information, store the received piece of status information of the second device with the identifying information to the status information log and cause broadcast of the received piece of status information.

9. The device of claim 7, wherein the at least one memory and the computer program code are configured to, with the at least one processor, further cause the device at least to:
send, in response to the device receiving a status information request, in a response to the status information request the status information log.

10. The device of claim 9, wherein the at least one memory and the computer program code are configured to, with the at least one processor, further cause the device at least to send in the response the latest pieces of status information of the first device and of the one or more second devices.

11. The device of claim 9, wherein the at least one memory and the computer program code are configured to, with the at least one processor, further cause the device at least to:
determine, whether the status information request is addressed to a specific device;
send, in response to the status information not being addressed to a specific device, in the response the status information log; and,
send, in response to the status information being addressed to a specific device, a response comprising one or more pieces of status information of the specific device in the status information log.

12. The device of claim 7, wherein the device is one of a group comprising a drive, a frequency converter, a wind turbine and a solar inverter.

13. A system comprising at least one site that comprises at least one device network that comprises plurality of devices of claim 7, and at least one user apparatus that may enter the site, establish a connection to at least one device of the plurality of the devices to acquire the status information log in the one device.

14. The system of claim 13, wherein the device is further configured at least to:
generate identifying information for the piece of status information of the device;
cause broadcast of the piece of the status information of the device with the identifying information;
determine from each received broadcast identifying information with which the received piece of status information of a second device is broadcasted;

compare the identifying information with identifying information stored to the status information log;

in response to a comparison result being that the status information log comprises the same identifying information, ignore the received piece of status information; and in response to the comparison result being that the status information log does not comprise the same identifying information, store the received piece of status information of the second device with the identifying information to the status information log and cause broadcast of the received piece of status information.

15. The system of claim 13, wherein the device is further configured at least to send, in response to the device receiving a status information request, in a response to the status information request the status information log.

16. The system of claim 15, wherein the device is further configured at least to send in the response the latest pieces of status information of the first device and of the one or more second devices.

17. The system of claim 15, wherein the device is further configured at least to:

determine, whether the status information request is addressed to a specific device;

in response to the status information not being addressed to a specific device, send in the response the status information log; and, in response to the status information being addressed to a specific device, send a response comprising one or more pieces of status information of the specific device in the status information log.

18. The system of claim 13, wherein the plurality of devices comprises one or more of a drive, a frequency converter, a wind turbine and a solar inverter.

* * * * *